(12) United States Patent
Flueckiger et al.

(10) Patent No.: US 12,262,808 B2
(45) Date of Patent: Apr. 1, 2025

(54) KEYBOARD-ATTACHED DEVICE STAND

(71) Applicant: Logitech Europe S.A., Lausanne (CH)

(72) Inventors: Jean-Marc Flueckiger, Hong Kong (CN); Kexin Yang, Shanghai (CN); Jinjun Xia, Suzhou (CN); Francesco Pozzato, Hong Kong (CN); Ming Feng Hsieh, Taipei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/875,928

(22) Filed: Jul. 28, 2022

(65) Prior Publication Data

US 2024/0032687 A1    Feb. 1, 2024

(51) Int. Cl.
*A47B 23/04*    (2006.01)

(52) U.S. Cl.
CPC ........ *A47B 23/04* (2013.01); *A47B 2023/049* (2013.01)

(58) Field of Classification Search
None
See application file for complete search history.

(56) References Cited

U.S. PATENT DOCUMENTS

| | | | | |
|---|---|---|---|---|
| 5,320,313 | A | * | 6/1994 | Crowe ............... A47B 21/0314 248/231.61 |
| 5,443,320 | A | * | 8/1995 | Agata ..................... G06F 1/166 361/679.19 |
| 5,835,344 | A | * | 11/1998 | Alexander ........... G06F 1/1628 361/679.55 |
| 6,352,233 | B1 | * | 3/2002 | Barberich ............ G06F 1/1632 248/676 |
| 6,619,597 | B1 | * | 9/2003 | Sheppard ........... A47B 21/0371 361/679.19 |
| 6,681,926 | B2 | * | 1/2004 | DeVolpi ................ G06F 3/0489 206/320 |
| 2013/0075542 | A1 | * | 3/2013 | Hsu ..................... A47B 21/0314 248/440.1 |
| 2013/0277529 | A1 | * | 10/2013 | Bolliger ............... G06F 1/1632 248/676 |

\* cited by examiner

*Primary Examiner* — Steven M Marsh
(74) *Attorney, Agent, or Firm* — Kilpatrick Townsend & Stockton LLP

(57) ABSTRACT

A device stand may include a base having a support portion and a connector portion. An upper surface of the connector portion may include at least one coupling mechanism that is configured to engage with a corresponding feature of a keyboard housing to secure the base with the keyboard housing. The device stand may include a first support member coupled with the support portion. The device stand may include a second support member coupled with the support portion and laterally spaced apart from the first support member to form a channel between the first support member and the second support member. The channel may be sized to receive a computing device.

18 Claims, 8 Drawing Sheets

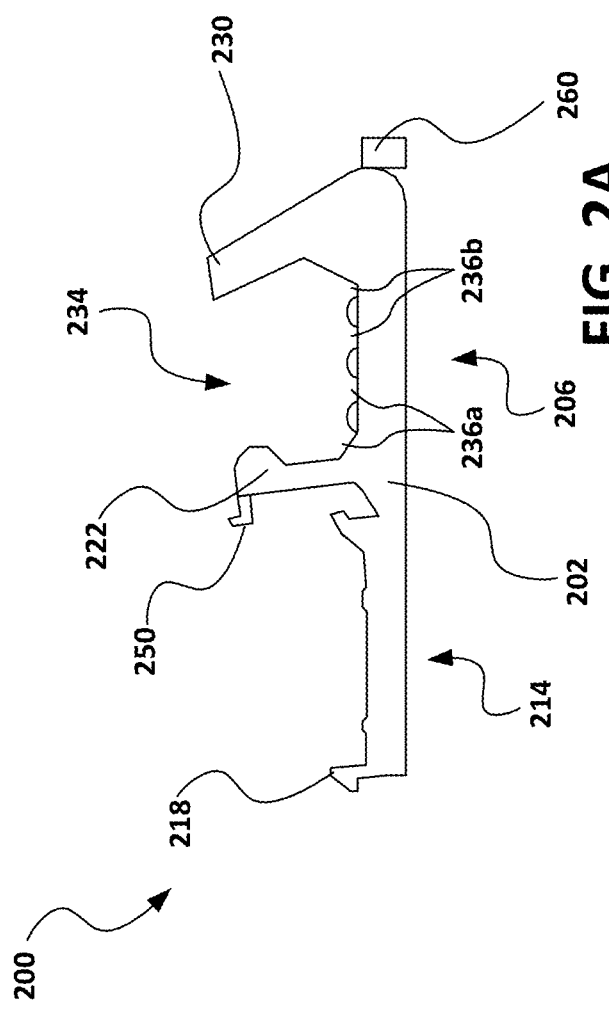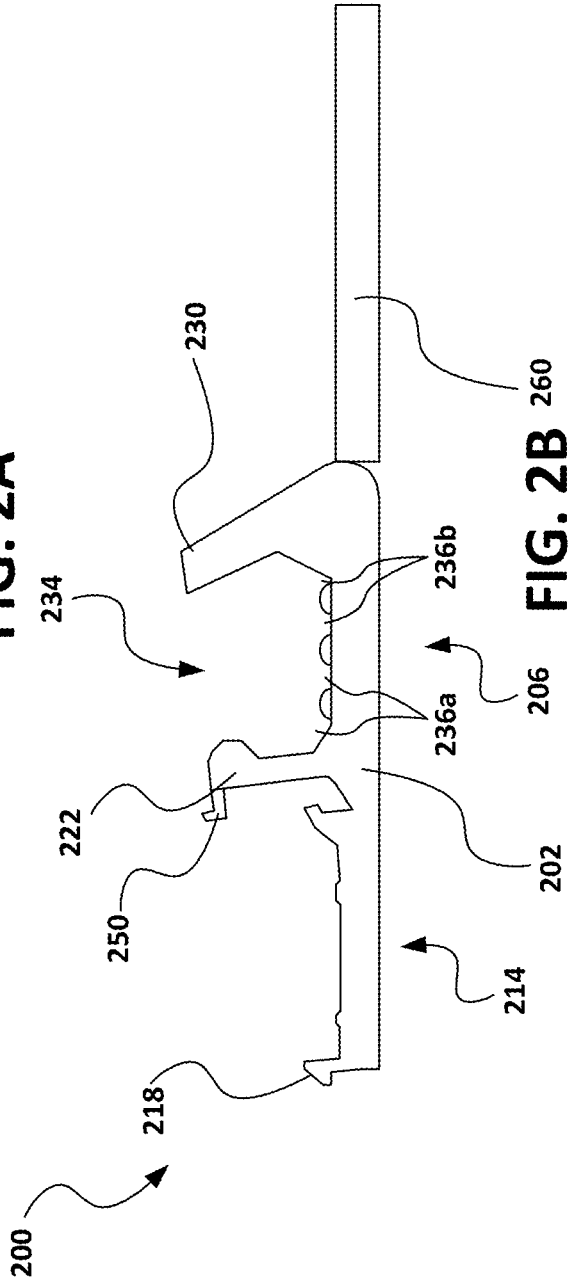

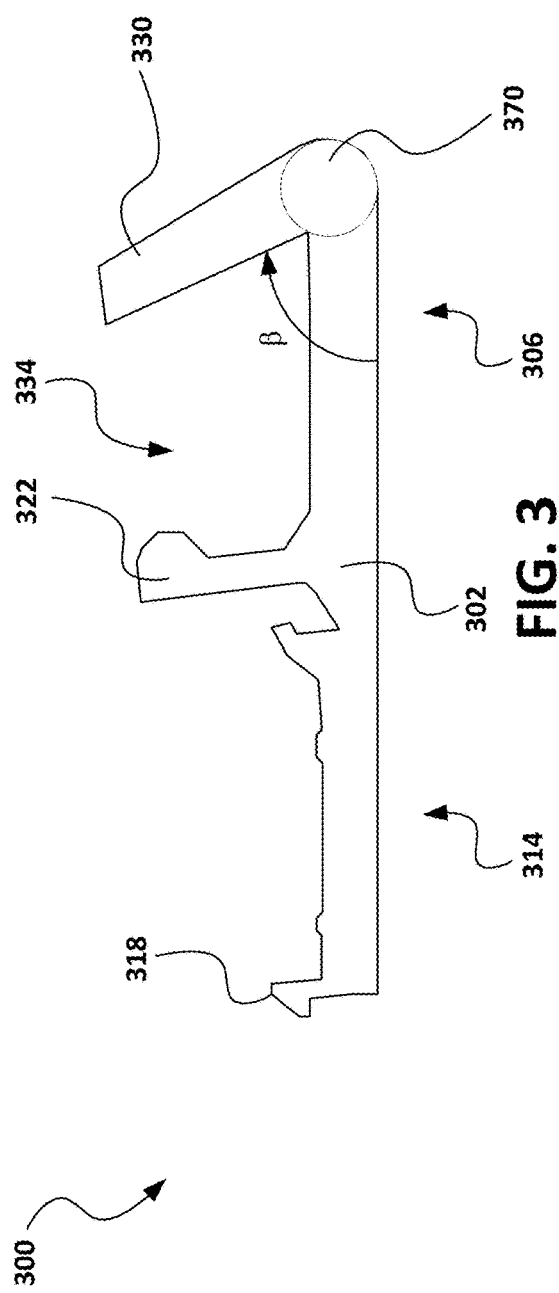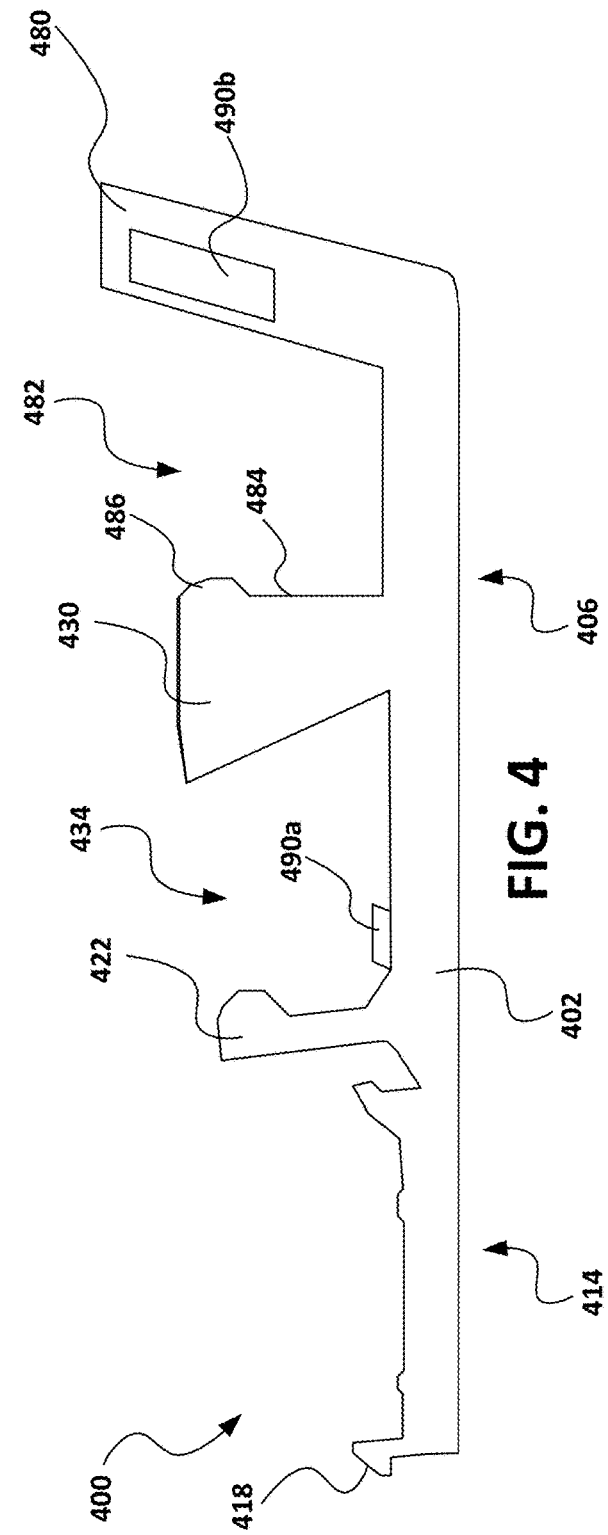

KEYBOARD-ATTACHED DEVICE STAND

BACKGROUND OF THE INVENTION

Many mobile computing devices, including smart phones, tablet computers, and e-readers do not have physical keyboards and may instead rely on touchscreen keyboards to enable data entry. This may be adequate for quick tasks, such as web browsing, but may be inconvenient for more typing-intensive tasks such, such as email and word processing. Therefore, many users may opt to use a peripheral wireless keyboard with such devices when performing more typing intensive tasks. However, mobile computing devices often do not include stands and are not typically self-standing in a proper viewing orientation for typing tasks. Therefore, there is a need to provide solutions that securely support mobile computing devices in a desired orientation when using wireless or other keyboards.

BRIEF SUMMARY OF THE INVENTION

Some embodiments of the present invention may encompass device stands. The device stands may include a base having a support portion and a connector portion. An upper surface of the connector portion may include at least one coupling mechanism that is configured to engage with a corresponding feature of a keyboard housing to secure the base with the keyboard housing. The device stands may include a first support member coupled with the support portion. The device stands may include a second support member coupled with the support portion and laterally spaced apart from the first support member to form a channel between the first support member and the second support member. The channel may be sized to receive a computing device.

In some embodiments, the connector portion may be configured to replace a battery cover of the keyboard housing. A rear surface of the first support member may include a nub that protrudes laterally from the rear surface. A front portion of the first support member may include an additional coupling mechanism that is configured to engage with a corresponding coupling feature of the keyboard housing. One or both of the first support member and the second support member may include one or both of a high friction material and a compressible material. A top surface of the support portion may define a number of grooves in a base of the channel. The device stands may include a third support member coupled with the support portion and laterally spaced apart from the second support member to form an additional channel between the second support member and the third support member. One or both of a depth and a width of the additional channel and the channel may be different.

Some embodiments of the present technology may encompass device stands that may include a base having a support portion and a connector portion coupled with a proximal side of the support portion. An upper surface of the connector portion may include at least one coupling mechanism that is configured to engage with a corresponding feature of a keyboard housing to secure the base with the keyboard housing. The device stands may include a first support member coupled with the proximal side of the support portion. The device stands may include a second support member coupled with the support portion at a distal side of the support portion. The second support member may be laterally spaced apart from the first support member to form a channel between the first support member and the second support member. The second support member may extend upward from the support portion at an acute angle.

In some embodiments, the second support member may be coupled with the support portion via a hinge that adjusts the acute angle of the second support member relative to the support portion. The device stands may include one or more extendible supports that are coupled with one or both of the base and the second support member. The one or more extendible supports may be extendible using at least one feature selected from the group consisting of a foldable feature, a telescoping feature, and a removable connector. The device stands may include a device charger disposed within the channel. An interior angle of the second support member may include a fillet.

Some embodiments of the present technology may encompass systems for supporting a computing device. The systems may include a keyboard having a keyboard housing. A bottom surface of the keyboard housing may include a component access region having a first coupling mechanism. The systems may include a device stand. The device stand may include a base having a support portion and a connector portion. An upper surface of the connector portion may include a second coupling mechanism that is engageable with the first coupling mechanism to secure the base with the keyboard housing. The connector portion may form a cover for the component access region. The device stand may include a first support member coupled with the support portion. The device stand may include a second support member coupled with the support portion and laterally spaced apart from the first support member to form a channel between the first support member and the second support member. The channel may be sized to receive a computing device.

In some embodiments, when the first coupling mechanism and the second coupling mechanism are engaged with one another, a bottom surface of the base may not extend downward beyond a lowermost point of the keyboard housing. The component access region may extend along a portion of both the bottom surface of the keyboard housing and a rear surface of the keyboard housing. The cover for the component access region may be generally L-shaped and may include at least a portion of a front surface of the first support member. The first support member may be positioned against a rear surface of the keyboard housing when the first coupling mechanism and the second coupling mechanism are engaged with one another. The keyboard housing and the device stand may include a same material. A height of each of the first support member and the second support member may be less than a height of the keyboard housing.

BRIEF DESCRIPTION OF THE DRAWINGS

A further understanding of the nature and advantages of the disclosed technology may be realized by reference to the remaining portions of the specification and the drawings.

FIG. 2A is a side elevation view of a device stand with an extendible support in a stowed configuration according to embodiments of the present invention.

FIG. 2B is a side elevation view of the device stand of FIG. 2A with the extendible support in an extended configuration according to embodiments of the present invention.

FIG. 3 is a side elevation view of a device stand with a hinged support member according to embodiments of the present invention.

FIG. 4 is a side elevation view of a device stand with multiple channels according to embodiments of the present invention.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to device stands that are designed to securely hold a mobile computing device (e.g., a tablet computer, a smart phone, an e-reader, etc.) at a desired angle while typing using an external keyboard. In particular, the device stands described herein may include a connector portion that is configured to engage with one or more corresponding connectors on a bottom and/or rear of a keyboard housing to secure the device stand to the keyboard housing. In some embodiments, the connector portions of the device stands may be designed to replace an existing cover of a component access region. For example, the connector portions may be sized and shaped to replace a battery cover, wireless receiver cover, and/or other removable portion of the keyboard housing. Embodiments may enable a position and orientation of the device stand (and device supported thereon) to be maintained relative to an attached keyboard.

In some embodiments, the entire device may be formed from a single piece of material, such as (but not limited to) a polymeric material, a resin, and/or a metal material. For example, a material may be extruded, molded, machined, and/or otherwise formed into the device stand. In other embodiments, the device stands described herein may include multiple materials and/or may include more complicated designs that may incorporate one or more moving joints and/or other features. While discussed primarily in the context of device stands for mobile computing devices during typing it will be appreciated that the device stands described herein are not limited to such applications. For example, the device stands may be used to hold paper, books, sheet music, notepads, and/or other media that may be referenced during typing and/or other operations.

Figure 1A:
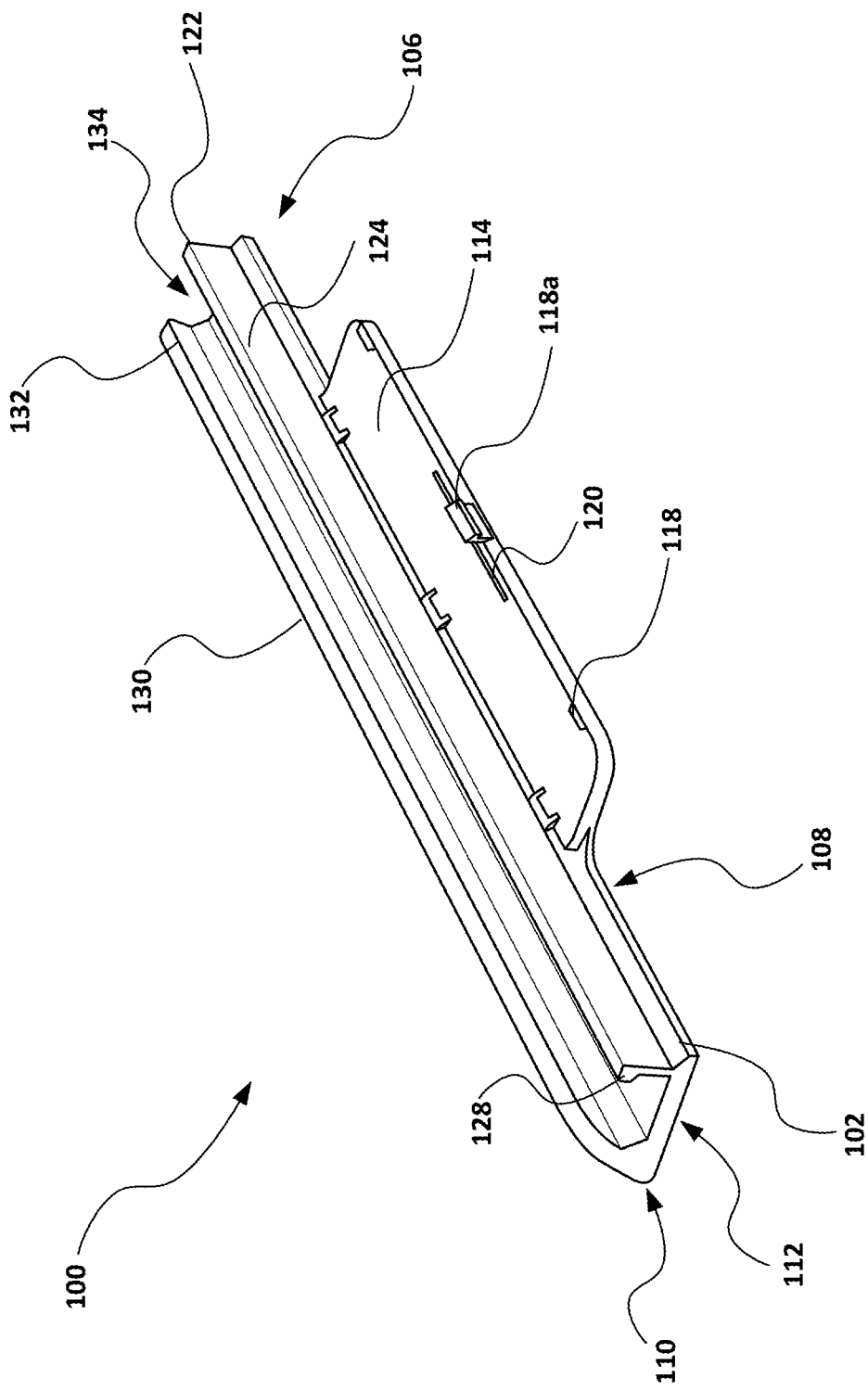
FIG. 1A is an isometric view of a device stand according to embodiments of the invention.
Figure 1B:
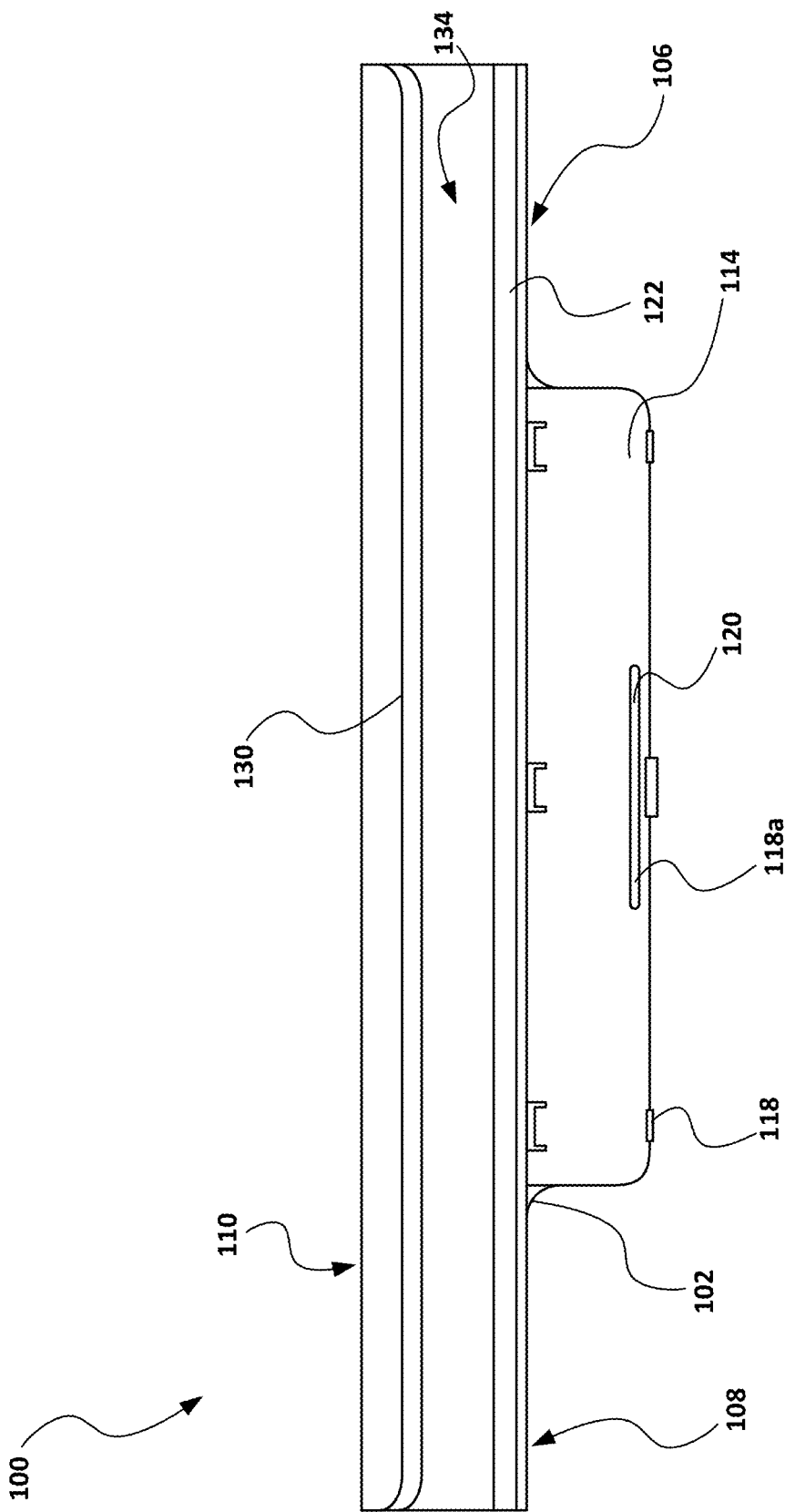
FIG. 1B is a top plan view of the device stand of FIG. 1A.
Figure 1C:
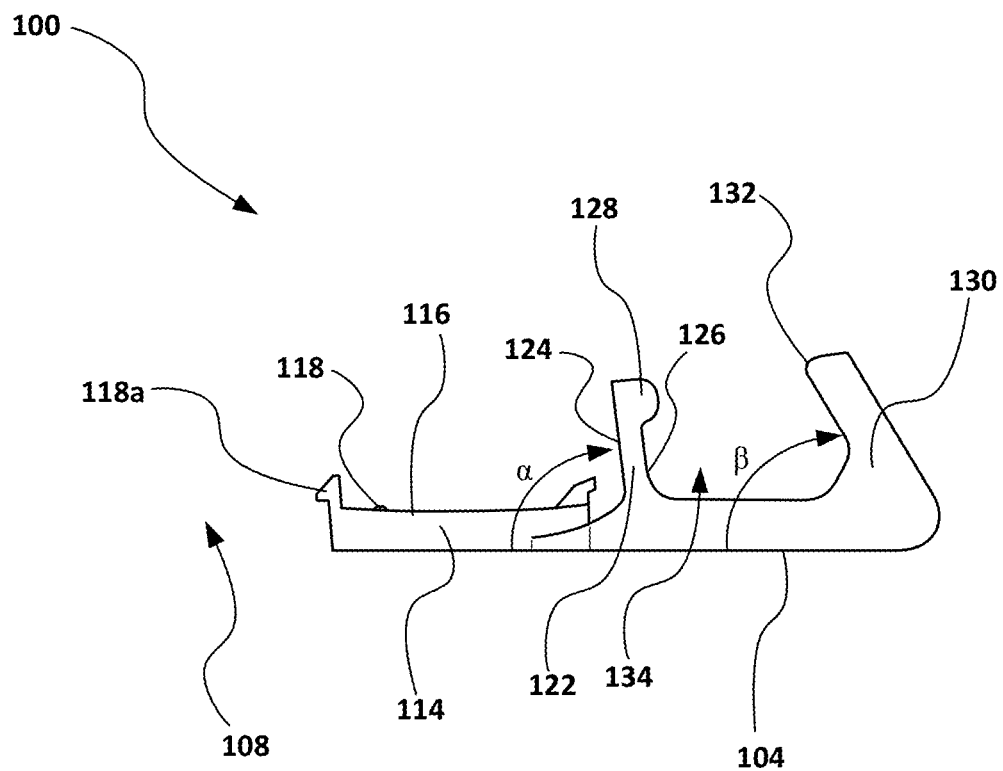
FIG. 1C is a side elevation view of the device stand of FIG. 1A.

Turning now to FIGS. 1A-1C, an embodiment of a device stand 100 is illustrated. Device stand 100 may include a base 102, which may have a bottom and/or lowermost surface 104 that may be at least substantially planar (or otherwise enable the device stand 100 to be stably supported along a length of the device stand 100) in some embodiments. The base 102 may include a support portion 106 and a connector portion 114. Support portion 106 may include a proximal side 108 and a distal side 110 that are separated by a medial region 112. The support portion 106 may be coupled with the connector portion 114, which may be coupled with the proximate side 108. The support portion 106 and connector portion 114 may be integrally formed in some embodiments, while in other embodiments the support portion 106 and connector portion 114 may be separately formed and subsequently joined, such as using one or more fasteners, adhesives, and/or other coupling mechanisms.

An upper surface 116 of the connector portion 114 may define and/or otherwise include one or more coupling mechanisms 118. The coupling mechanisms 118 may include magnets, snaps, sliding tracks, fasteners and/or other mechanical coupling mechanisms. Each coupling mechanism 118 may be configured to reversibly couple the connector portion 114 with a corresponding feature of a keyboard housing, such as a component access region (e.g., a battery compartment). As used herein, the term "reversibly coupled" is understood to mean that two components may be coupled together and removed from one another (with or without the use of tools) without damaging the components. As illustrated, a number of coupling mechanisms 118 are provided at various edge locations of the upper surface 116, with each coupling mechanism 118 being in the form of a hooked protrusion. Each hooked protrusion is configured to be inserted within a recess formed in a keyboard housing (such as illustrated in FIGS. 5B and 5C). An exterior surface of the hook of each protrusion may contact an exterior surface of the keyboard housing and cause the protrusion to deflect in an opposite direction from the hook to enable the hooked protrusion to be inserted within the recess. Upon insertion, the hook of each protrusion may rebound to its original position and an interior surface of the hook may contact an interior surface of the housing to prevent the protrusion from being removed from the recess. In some embodiments, each of the coupling mechanisms 118 may be identical, while in other embodiments one or more of the coupling mechanisms 118 may be different than at least one other coupling mechanism 118. For example, as illustrated, coupling mechanism 118a may be larger than the other coupling mechanisms 118 and may provide a greater retention force when engaged with a recess or other coupling feature of a keyboard housing.

In some embodiments, the connector portion 114 may define a removal slot 120. The removal slot 120 may be positioned proximate one or more of the coupling mechanisms 118. As illustrated, the removal slot 120 is positioned proximate coupling mechanism 118a and is oriented in a direction such that a prying force applied to the connector portion 114 via the removal slot 120 may help disengage the coupling mechanism 118a from a recess or other coupling feature of a keyboard housing. For example, a user may insert a coin, flathead screwdriver, and/or other flat, rigid object through the removal slot 120. A prying force may be applied in a direction opposite the hook of the coupling mechanism 118 using the flat object, which may pull the hook out of contact with an inner surface of the keyboard housing and may enable the connector portion 114 to be disengaged from the keyboard housing.

The connector portion 114 may be sized and shaped to match or otherwise correspond to a shape of a portion of a keyboard housing. For example, the connector portion 114 may be sized and shaped such that the coupling mechanisms 118 are aligned with corresponding coupling features of a keyboard housing. In some embodiments, the connector portion 114 may be designed to replace a portion of the keyboard housing. For example, the keyboard housing may include one or more removable portions, such as battery covers, wireless receiver covers, connector storage regions (e.g., universal serial bus (USB) dongle storage regions), and/or other portions that are designed to cover one or more component access regions of the keyboard in which one or more internal components of the keyboard may be accessed. All or a portion of the connector portion 114 may be sized and shaped to match a shape of one or more of the removable portions of the keyboard housing (and a corresponding component access region). As just one example, the geometry of the connector portion 114 (e.g., length, width, shape, etc.) may match that of a battery cover of the keyboard housing such that the battery cover may be removed and replaced by the connector portion 114. Such a design may also enable the base 102 of the device stand 100 to be securely coupled with the keyboard housing.

The device stand 100 may include a first support member 122 that may be coupled with the support portion 106. For example, the first support member 122 may protrude upward from an upper surface of the support portion 106. The first support member 122 and the support portion 106 may be integrally formed in some embodiments, while in other embodiments the support portion 106 and first support member 122 may be separately formed and subsequently joined, such as using one or more fasteners, adhesives, and/or other coupling mechanisms. In some embodiments, the first support member 122 may be disposed at or proximate the proximal side 108 of the support portion 106. For example, a front surface 124 of the first support member 122 may be positioned proximate the connector portion 114. As best illustrated in FIG. 1C, the first support member 122 may extend upward from the support portion 106 at a generally vertical angle α. For example, an angle α of the front surface 124 may be between about 70 degrees and 100 degrees relative to horizontal and/or lowermost surface 104, between about 75 degrees and 95 degrees, between about 80 degrees and 90 degrees, or about 85 degrees. In some embodiments, angle α of the front surface 124 may match or substantially match an angle of a rear surface of a keyboard housing such that when the base 102 is coupled with the keyboard housing the front surface 124 is at least substantially parallel with the rear surface of the keyboard. In some embodiments, the first support member 122 may be deformable (e.g., made from a resilient material) such that contact between a rear surface of a keyboard housing and the front surface 124 may cause the first support member 122 to bend rearward and keep the front surface 124 in contact with the rear surface of the keyboard housing.

A rear surface 126 of the first support member 122 may include a nub 128 that may protrude laterally from the rear surface 126. For example, the nub 128 may protrude rearward in a direction of the distal side 110 of the support portion 106. As illustrated, the nub 128 is positioned at a top end of the first support member 122, although the nub 128 may be lower in some embodiments. The nub 128 may help retain a mobile computing device supported by the device stand 100 as will be discussed in greater detail below. In some embodiments, all or a portion of the first support member 122 (which may include nub 128) may be formed of and/or otherwise include a high friction material (e.g., rubber), a tacky material (e.g., a hydrogel, a reusable tape, etc.), and/or a compressible material (e.g., a low durometer rubber, foam, etc.) and/or may be textured to increase the gripping ability of the first support member 122 when a mobile computing device is supported by the device stand 100. In some embodiments, the rear surface 126 may define multiple nubs at different vertical positions, which may enable a support angle of a mobile computing device to be adjusted. For example, positioning a front corner of the mobile computing device against a higher nub may make a support angle of the mobile computing device shallower than when the front edge is positioned against a lower nub. In some embodiments, in place of, or in addition to, nub 128, the rear surface 126 may include one or more strips of material, such as a compressible and/or high friction material (e.g., rubber) that may contact a front surface of a mobile device and help secure the mobile device within the channel 134. In some embodiments, strips of different thicknesses may be provided at different locations along a length of the channel 134, which may enable mobile devices of different thicknesses to be held within the channel 134 and/or may enable a mobile device to be supported at a different angle depending on where the mobile device is positioned along the length of the channel 134. As just one example, thicker strips may be positioned proximate the ends of the channel 134 to support thinner devices and/or to provide flatter support angles, while thinner strips may be positioned within a medial region of the channel 134 to support thicker devices and/or to provide more upright support angles.

The device stand 100 may include a second support member 130 that may be coupled with the support portion 106. For example, the second support member 130 may protrude upward from an upper surface of the support portion 106. The second support member 130 and the support portion 106 may be integrally formed in some embodiments, while in other embodiments the support portion 106 and second support member 130 may be separately formed and subsequently joined, such as using one or more fasteners, adhesives, and/or other coupling mechanisms. In some embodiments, the second support member 130 may be disposed at or proximate the distal side 110 of the support portion 106. In some embodiments, the second support member 130 may extend upward from the support portion 106 at an acute angle, although right angles and/or obtuse angles are possible in various embodiments. As illustrated, the second support member 130 may project forward (e.g., toward the proximal side 108) and upward from the support portion 106. The second support member 130 may be at an angle R of between about 30 degrees and 120 degrees relative to horizontal and/or lowermost surface 104, between about 35 degrees and 110 degrees, between about 40 degrees and 100 degrees, between about 45 degrees and 90 degrees, between about 50 degrees and 80 degrees, between about 55 degrees and 70 degrees, or between about 60 degrees and 65 degrees. In some embodiments, an interior angle of the second support member 130 may include a fillet and/or other additional material that may provide strength and rigidity to the second support member 130. In some embodiments, all or a portion of the second support member 130 (which may include a distalmost surface 132) may be formed of and/or otherwise include a high friction material (e.g., rubber), a tacky material (e.g., a hydrogel, a reusable tape, etc.), and/or a compressible material (e.g., a low durometer rubber, foam, etc.) and/or may be textured to increase the gripping ability of the second support member 130 when a mobile computing device is supported by the device stand 100.

The first support member 122 and second support member 130 may be laterally spaced apart from one another to form a channel 134, with the base of the channel 134 being formed by an upper surface of the support portion 106. The channel may be sized to receive a mobile computing device (e.g., smart phone, tablet computer, e-reader, etc.) and/or other object. For example rear surface 126 of the first support member 122 and distalmost surface 132 of the second support member 130 may be laterally spaced apart by a distance that is sufficient to receive a mobile computing device. In some embodiments, the width of the channel 134 may be between about 5 mm and 20 mm, between about 5.5 mm and 18 mm, between about 6 mm and 16 mm, between about 6.5 mm and 14 mm, between about 7 mm and 12 mm, or between about 7.5 mm. In some embodiments, the channel 134 may be open ended, which may enable devices wider than a length of the channel 134 and/or multiple devices to be secured within the channel 134. In other embodiments, one or both ends of the channel 134 may be closed.

In some embodiments, the width and/or depth (e.g., height of a lowermost support member) of the channel 134 and/or a relative height of the first support member 122 (and/or height of the nub 128) and second support member 130 may be selected such that a mobile computing device (or other object) positioned within the channel 134 may be supported at a desired angle relative to horizontal and/or lowermost surface 104. For example, in some embodiments, a bottom-facing surface of the nub 128 may be positioned to contact a front surface of the mobile computing device, while the distalmost surface 132 may be positioned to contact a rear surface of the mobile computing device. The lateral and/or vertical distance between the nub 128 (or other portion of rear surface 126) and the distalmost surface 132 may be selected to produce any support angle for the mobile computing device and may depend on the thickness of the device being supported. Greater lateral distances may flatten a support angle (e.g., an angle between a surface of the mobile computing device and horizontal and/or lowermost surface 104) of the mobile computing device, while shorter lateral distances may steepen the support angle. Similarly, greater differences in vertical distance between the nub 128 (or other portion of rear surface 126) and the distalmost surface 132 may result in steeper support angles, while lesser differences may result in shallower support angles. In some embodiments, the lateral and/or vertical distance between the nub 128 (or other portion of rear surface 126) and the distalmost surface 132 may be selected to produce a support angle of the mobile computing device of between about 10 degrees and 90 degrees relative to horizontal and/or lowermost surface 104, between about 20 degrees and 80 degrees, between about 30 degrees and 70 degrees, or between about 40 degrees and 60 degrees. As noted above, in some embodiments, one or both of the first support member 122 and the second support member 130 may include a compressible material, such as on a distal end of the respective member, which may help improve the snugness/fit of the mobile computing device within the channel 134. Additionally, such a compressible material may better enable devices of various thicknesses to be securely supported within the channel 134.

A height of the first support member 122 and the second support member 130 may be between about 4 mm and 350 mm (as measured from a top surface of the base 102), between about 10 mm and 325 mm, between about 12 mm and 300 mm, between about 14 mm and 275 mm, between about 16 mm and 250 mm, between about 18 mm and 225 mm, between about 20 mm and 200 mm. Oftentimes, a height of each of the first support member 122 and the second support member 130 may be between about 8 mm and 50 mm, between about 10 mm and 40 mm, between about 12 mm and 30 mm, or between about 14 mm and 20 mm. The first support member 122 and the second support member 130 may have a same height or different heights. A difference in height between the first support member 122 and the second support member 130 may often be between about 0 mm and 300 mm, although the difference is often between about 0 mm and 45 mm, between about 0.5 mm and 40 mm, between about 1 mm and 35 mm, between about 1.5 mm and 30 mm, between about 2 mm and 25 mm, between about 2.5 mm and 20 mm, between about 3 mm and 15 mm, or between about 3.5 mm and 10 mm.

FIGS. 2A and 2B show schematic side elevation views of a device stand 200 according to some embodiments of the present technology. Device stand 200 may include any of the materials or components previously described, and may illustrate additional details of device stands (e.g., device stand 100, 300, 400, 500, 700) described herein. Device stand 200 may be similar to device stand 100 and may include a base 202 having a support portion 206 that is coupled with a connector portion 214. The connector portion 214 may include a number of coupling mechanisms 218. A first support member 222 and a second support member 230 may extend upward from the support portion 206.

In some embodiments, all or a portion of the first support member 222 may serve as an additional connector portion and/or housing cover replacement. For example, in some keyboard housings, removable covers (such as battery covers) may have generally L-shaped cross sections and may cover component access regions of the keyboard housing that extend into portions of both the bottom and rear surfaces of the keyboard housing. In such embodiments, all or a portion of the first support member 222 may be sized and shaped to match or otherwise correspond to a shape of a corresponding component access region of the keyboard housing such that the connector portion 214 and portion of the first support member 222 may, in conjunction, operate to replace a removable portion of the keyboard housing, (such as, but not limited to, a battery cover). For example, the connector portion 214 and at least a portion of the first support member 222 may interface with and cover a component access region of a keyboard housing, such as a battery compartment. All or a portion of the first support member 222 may be sized and shaped to match a shape of a vertical portion of one or more removable covers of the keyboard housing. As just one example, the combined geometry (e.g., length, width, shape, etc.) of the connector portion 214 and first support member 222 may match that of a vertical portion of a battery cover of the keyboard housing such that the battery cover may be removed and replaced by the connector portion 214 and first support member 222 to cover the exposed component access region. In some embodiments, the first support member 222 may include one or more coupling mechanisms 250, which may be disposed on a front surface 224 of the first support member 222. The coupling mechanisms 250 may be a similar form as the coupling mechanisms 218 and/or may be different in some embodiments. The coupling mechanisms 250 may be engageable with corresponding connectors on a rear surface of a keyboard housing.

The first support member 222 and second support member 230 may be laterally spaced apart to form a channel 234. In some embodiments, the upper surface of the channel 234 may include one or more grooves 236 and/or ridges that may extend along a length of channel 234. The grooves 236 may receive a bottom corner of a mobile computing device secured within the channel 234, and may help set a support angle of the mobile computing device. For example, when the bottom corner of the mobile computing device is secured in a more forward groove 236a (e.g., closer to the proximal side 108), the mobile computing device may be maintained at a shallower support angle. Similarly, when the bottom corner of the mobile computing device is secured in a more rearward groove 236b (e.g., closer to the distal side 110), the mobile computing device may be maintained at a steeper support angle. The width, number, and/or spacing of the grooves 236 may be selected to enable the support angle of a mobile computing device to be adjusted at predetermined intervals, such as 5 degree increments, 10 degree increments, 15 degree increments, and/or any other increment.

In some embodiments, the stand device 200 may include one or more extendible supports 260, which may be coupled with the base 202 and/or the second support member 230. The extendible supports 260 may be moved between a stowed position (shown in FIG. 2A) and an extended position (shown in FIG. 2B). In the stowed position, the extendible supports 260 may be telescoped inward, folded against the second support member 230 and/or base 202, and/or may be otherwise retracted. In the extended position, the extendible supports 260 may be telescoped outward, unfolded away from the second support member 230 and/or base 202, and/or may be otherwise extended to increase a footprint of the device stand 200. At least a portion of each extendible support 260 may be at a height that is substantially the same as a height of a lowermost surface 204 of the base 202. This may enable the extendible supports 260 to provide additional stability to the device stand 200, and in particular when a larger and/or heavier mobile computing device (or other object) is supported by the device stand 200. The extendible supports 260 may be permanently coupled with the base 202 and/or the second support member 230, such as via one or more pivoting joints, telescoping joints, and/or other joints. In other embodiments, the extendible supports 260 may be removably/reversibly coupled with the base 202 and/or the second support member 230. For example, snap connections, threaded connections, and/or other reversible connectors may be used to reversibly couple the extendible supports 260 with the base 202 and/or the second support member 230. In such embodiments, the stowed position may be a position in which the extendible supports 260 are fully removed from the base 202 and/or the second support member 230.

FIG. 3 shows a schematic side elevation view of a device stand 300 according to some embodiments of the present technology. Device stand 300 may include any of the materials or components previously described, and may illustrate additional details of device stands (e.g., device stand 100, 200, 400, 500, 700) described herein. Device stand 300 may be similar to device stand 100 or 200 and may include a base 302 having a support portion 306 that is coupled with a connector portion 314. The connector portion 314 may include a number of coupling mechanisms 318. A first support member 322 and a second support member 330 may extend upward from the support portion 306 and a channel 334 may be defined therebetween. The second support member 330 may be coupled with the support portion 306 via a hinge 370 that enables an angle β of the second support member 330 to be adjusted relative to horizontal and/or a lowermost planar surface of the device stand 300. The adjustment of the angle θ of the second support member 330 may cause a corresponding adjustment in support angle of a mobile computing device (or other object) supported by the device stand 300. For example, as the angle β of the second support member 330 increases, a support angle of the mobile computing device may become more shallow, while smaller angles of the second vertical support 330 may result in steeper support angles. In some embodiments, the hinge 370 may include a number of preset positions that enable the second support member 330 to be moved to one of a number of predetermined angles, which may be at regular or irregular intervals. For example, the hinge 370 may enable the second support member 330 to be moved at 5 degree, 10 degree, 15 degree, etc. intervals. In other embodiments, internal friction of the hinge 370 may enable the second support member 330 to be maneuvered to any angle at any increment. In some embodiments, the hinge 370 may include a tightening mechanism, such as a screw that may be loosened to enable the angle to be adjusted and then tightened to fix the angle at a desired position.

FIG. 4 shows a schematic side elevation view of a device stand 400 according to some embodiments of the present technology. Device stand 400 may include any of the materials or components previously described, and may illustrate additional details of device stands (e.g., device stand 100, 200, 300, 500, 700) described herein. Device stand 400 may be similar to device stand 100, 200, or 300 and may include a base 402 having a support portion 406 that is coupled with a connector portion 414. The connector portion 414 may include a number of coupling mechanisms 418. A first support member 422 and a second support member 430 may extend upward from the support portion 406. Device stand 400 may also include a third support member 480, which may be coupled with the support portion 406. The third support member 480 may be similar to second support member 430 in some embodiments. The third support member 480 may be laterally spaced apart from the second support member to form an additional channel 482 between the second support member 430 and the third support member 480.

Channel 434 and additional channel 482 may have different dimensions in some embodiments. For example, the height and/or width of the additional channel 482 may be different than the height and/or width of the channel 434. This may enable the two channels to accommodate different mobile computing devices (or other objects) and/or to support a mobile computing device at a different support angle. The relative heights of the first support member 422, second support member 430, and third support member 480 may be selected to provide different support angles for a mobile computing device. For example, the third support member 480 may be taller than the second support member 430, which may be at a same height or taller than the first support member 422. The difference in height between the second and third support members may be different than the difference in height between the first and second support members to enable the channels to provide different support heights. Any combination of channel depth, channel width, absolute height of the support members, and/or relative heights of the support members may be provided to enable the channels to accommodate different mobile computing devices and/or to provide different support angles.

In some embodiments, the second support member 430 may include a generally vertical rear surface 484, which may include a nub 486. For example, a thickness of the second support member 430 may be increased (relative to other second support members described herein) and/or an additional vertical portion may extend from the second support member 430 to provide the generally vertical rear surface 484. The generally vertical rear surface 484 and/or nub 486 may provide a contact point and/or retaining mechanism for a front edge of a mobile computing device (or other object) when inserted within the additional channel 482.

While shown with three support members and two channels, it will be appreciated that any number of support members and/or channels may be included on a given support stand. Additionally, one or more of the support members may include additional features, such as a hinge that enables an angle of the respective support member, and subsequently a support angle provided by a respective channel, to be adjusted.

In some embodiments, the channel 434 and/or additional channel 482 may include one or more device chargers 490. For example, a base of the channel 434 may include a device charger 490a that includes one or more electrical connectors (e.g., USB, Lightning, pinned connection, etc.) that may interface with a charging port on a mobile computing device. One of the support members may include a device charger 490. For example, as illustrated, the third support member 408 includes a wireless charger 490b, which may be coupled with and/or embedded within the third support member 480. The wireless charger 490b may be an inductive or resonant charger. In some embodiments, the device chargers 490 may also, or alternatively, act as connectors that communicatively couple a connected mobile computing device with a keyboard interfaced with the device stand 400. The device stand 400 may include a corresponding connector (not shown) that couples to a port or other connector of a keyboard to access the keyboard's power source and/or communication interface to enable the keyboard to charge and/or control the connected mobile computing device.

Figure 5:
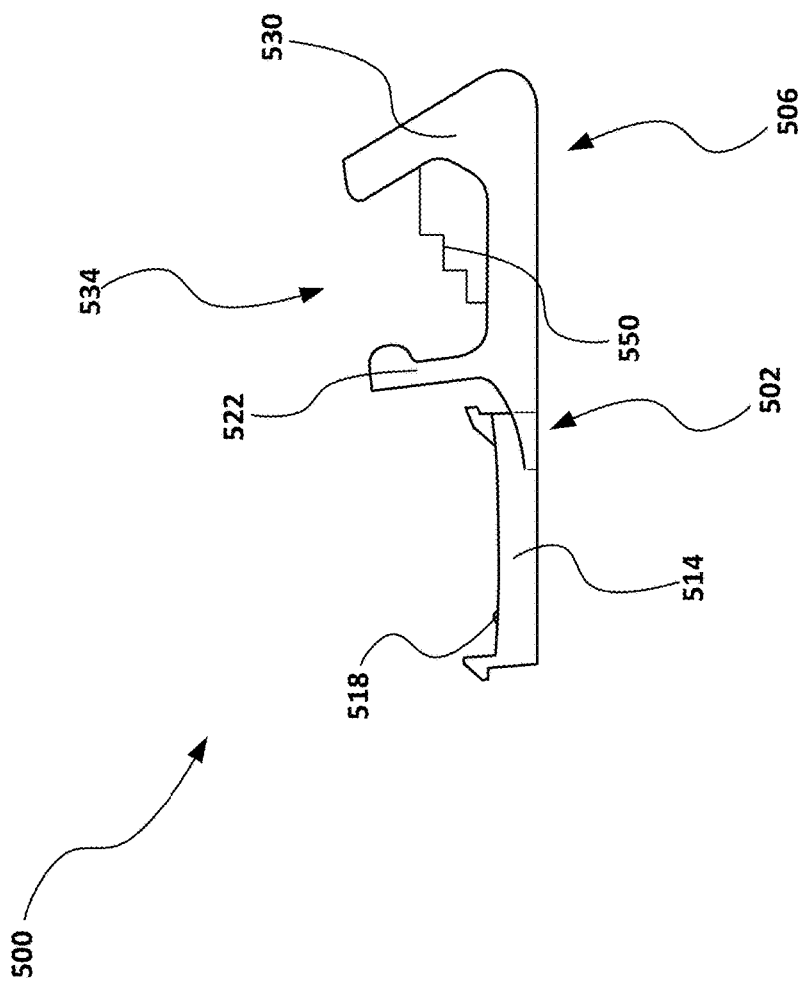
FIG. 5 is a side elevation view of a device stand with steps according to embodiments of the present invention.

FIG. 5 shows a schematic side elevation view of a device stand 500 according to some embodiments of the present technology. Device stand 500 may include any of the materials or components previously described, and may illustrate additional details of device stands (e.g., device stand 100, 200, 300, 400, 700) described herein. Device stand 500 may be similar to device stand 100, 200, 300, or 400 and may include a base 502 having a support portion 506 that is coupled with a connector portion 514. The connector portion 514 may include a number of coupling mechanisms 518. A first support member 522 and a second support member 530 may extend upward from the support portion 506 and a channel 534 may be defined therebetween. In some embodiments, one or more steps 550 may be disposed within the channel 534. Each step 550 may have a different height, such that each step enables mobile devices to be secured within the channel 534 at different heights and/or angles. Any number of steps 550 may be included within channel 534. For example, the channel 534 may include at least one step, at least two steps, at least three steps, at least four steps, or more. Each step 550 may have a same or different width, and height increments between adjacent steps 550 may be uniform or may vary. While illustrated with the steps 550 being arranged in ascending height from a front of the device stand 500, it will be appreciated that other arrangements, such as descending height, may be used in various embodiments.

Figure 6A:
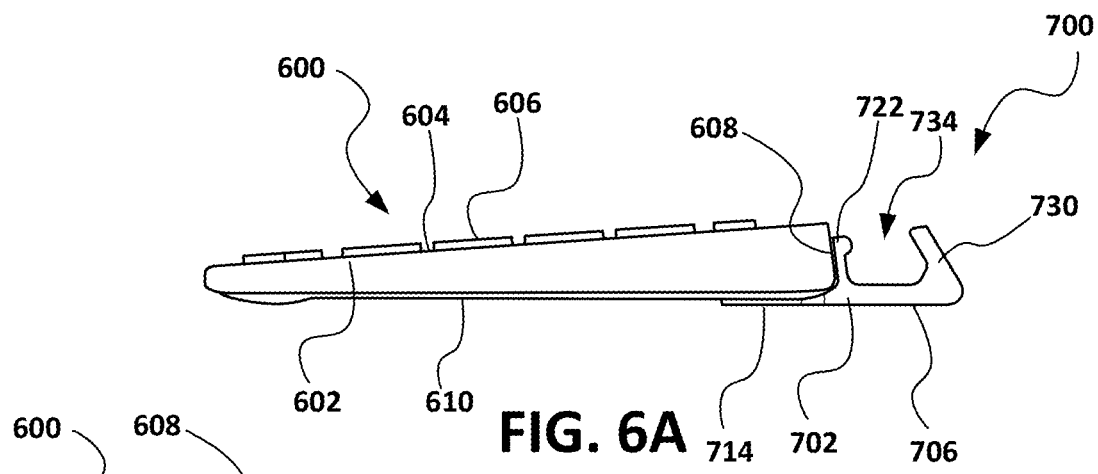
FIG. 6A is a side elevation view of a device stand coupled with a keyboard according to embodiments of the present invention.

FIG. 6A illustrates a keyboard 600 interfaced with device stand 700. Device stand 700 may be similar to other device stands described herein and may include any of the materials or components previously described in relation to device stands 100, 200, 300, 400, and 500. Device stand 700 may be similar to device stand 100, 200, 300, 400, and 500 and may include a base 702 having a support portion 706 that is coupled with a connector portion 714. The connector portion 714 may include a number of coupling mechanisms (not shown) that may be engaged with corresponding coupling features on a housing 602 of the keyboard 600. A first support member 722 and a second support member 730 may extend upward from the support portion 706, with the support members being laterally spaced apart to define a channel 734.

Keyboard housing 602 may include a top surface 604 having a number of keys 606 disposed thereon, a rear surface 608, and a bottom surface 610. The bottom surface 610 and/or rear surface 608 may include one or more removable housing portions, such as covers for component access regions that may enable a user to access internal components of the keyboard 600. For example, the bottom surface 610 and/or rear surface 608 may include a battery region 612 having a removable battery cover (not shown). The connector portion 714 of the device stand 700 may be interfaced with the battery region 612 (or other component access region of the keyboard housing 602). For example, the coupling mechanisms of the connector portion 714 may engage with corresponding coupling mechanisms provided on the battery region 612 (or other component access region of the keyboard housing 602).

Figure 6B:
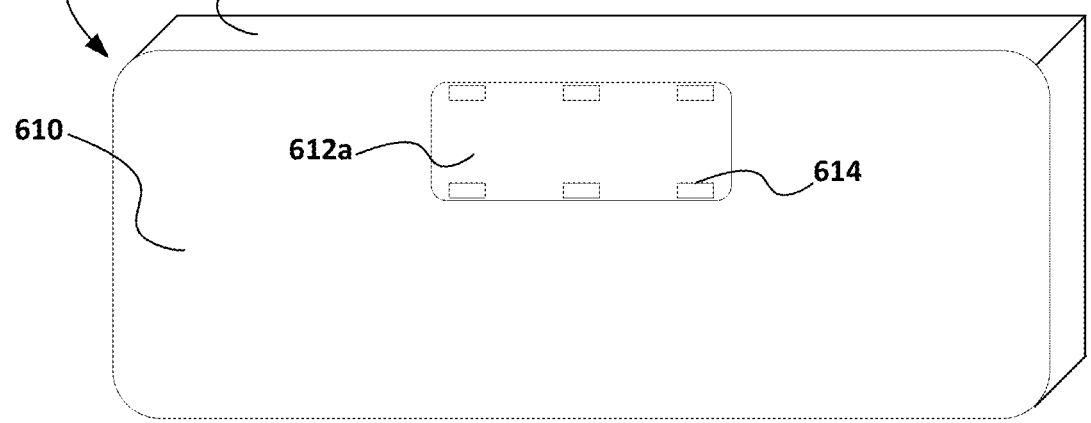
FIG. 6B shows a component access region of a keyboard housing according to embodiments of the present invention.
Figure 6C:
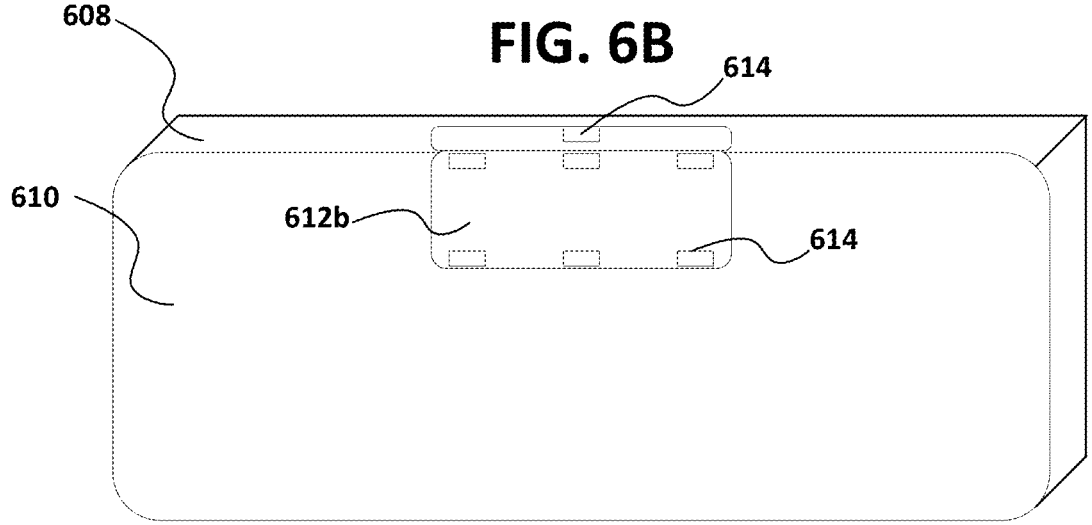
FIG. 6C shows a component access region of a keyboard housing according to embodiments of the present invention.

FIGS. 6B and 6C illustrate embodiments of battery access regions 612 of keyboard 600. For example, a battery access region 612a may be provided on a single surface of the keyboard housing 602, such as the rear surface 608 or the bottom surface 610. A battery cover for battery access region 612a may have a generally flat cross section. A number of coupling mechanisms 614 may be included on the battery access region 612a. The coupling mechanisms 614 may take various forms (e.g., tabs, protrudes, snaps, etc.), but as illustrated include a number of recesses that are configured to receive hooked protrusions of a battery cover. In other embodiments, a battery access region 612b may be provided that extends into multiple surface of the keyboard housing 602, such as the rear surface 608 and the bottom surface 610. A battery cover for battery access region 612b may have a generally L-shaped cross section. A number of coupling mechanisms 614 may be included on the battery access region 612b. The coupling mechanisms 614 may take various forms (e.g., tabs, protrudes, snaps, slide tracks, etc.), but as illustrated include a number of recesses that are configured to receive hooked protrusions of a battery cover. In some embodiments, coupling mechanisms 614 may be provided on both surfaces of the housing 602 (e.g., rear surface 608 and bottom surface 610), while in other embodiments only a single surface may include the coupling mechanisms. In some embodiments, different coupling mechanisms may be used for each surface. For example, a sliding track may be provided on one of the rear surface 608 or the bottom surface 610, while a snap-fit connector (such as a recess and/or protrusion) may be provided on the other surface. This may enable a corresponding track mechanism of a battery cover to be slid into engagement with a sliding track and snap-fit connectors of the battery cover and the battery access region 612 to be subsequently engaged. In some embodiments, the coupling mechanisms 614 may include threaded apertures that enable screws and/or other threaded fasteners to couple the battery cover to the battery access region 612.

As noted above, the connector portion 714 of the device stand 700 may be used to replace the battery cover or other removable portion of the keyboard housing 602. The connector portion 714 may be sized and shaped to correspond with a size and shape of the battery access region 612, with coupling mechanisms of the connector portion 714 being positioned to be in alignment with and to engage with coupling mechanisms 614 of the housing 602. In embodiments in which the battery access region 612 extends into multiple surfaces (e.g., battery access region 612b), a portion of the front surface of the first support member 722 may be sized and shaped to match a portion of the battery access region 612 that extends into the rear surface 608 of the keyboard housing 602, enabling the connector portion 714 and at least a portion of the first support member 722 to interface and cover the battery access region of the housing 602. In some embodiments, rather than being a component access region, an area of the keyboard housing 602 with which the connector portion 714 is engaged may be a dedicated mount for a peripheral device (such as the device stand 700). In some embodiments, to facilitate removal of the connector portion 714 and device stand 700 from the keyboard housing 602, a gap may be provided between at least a portion of the connector portion 714 and the battery access region 612 that enables the components to be rotated and/or otherwise moved relative to one another to disenables the various coupling mechanisms.

Figure 6D:
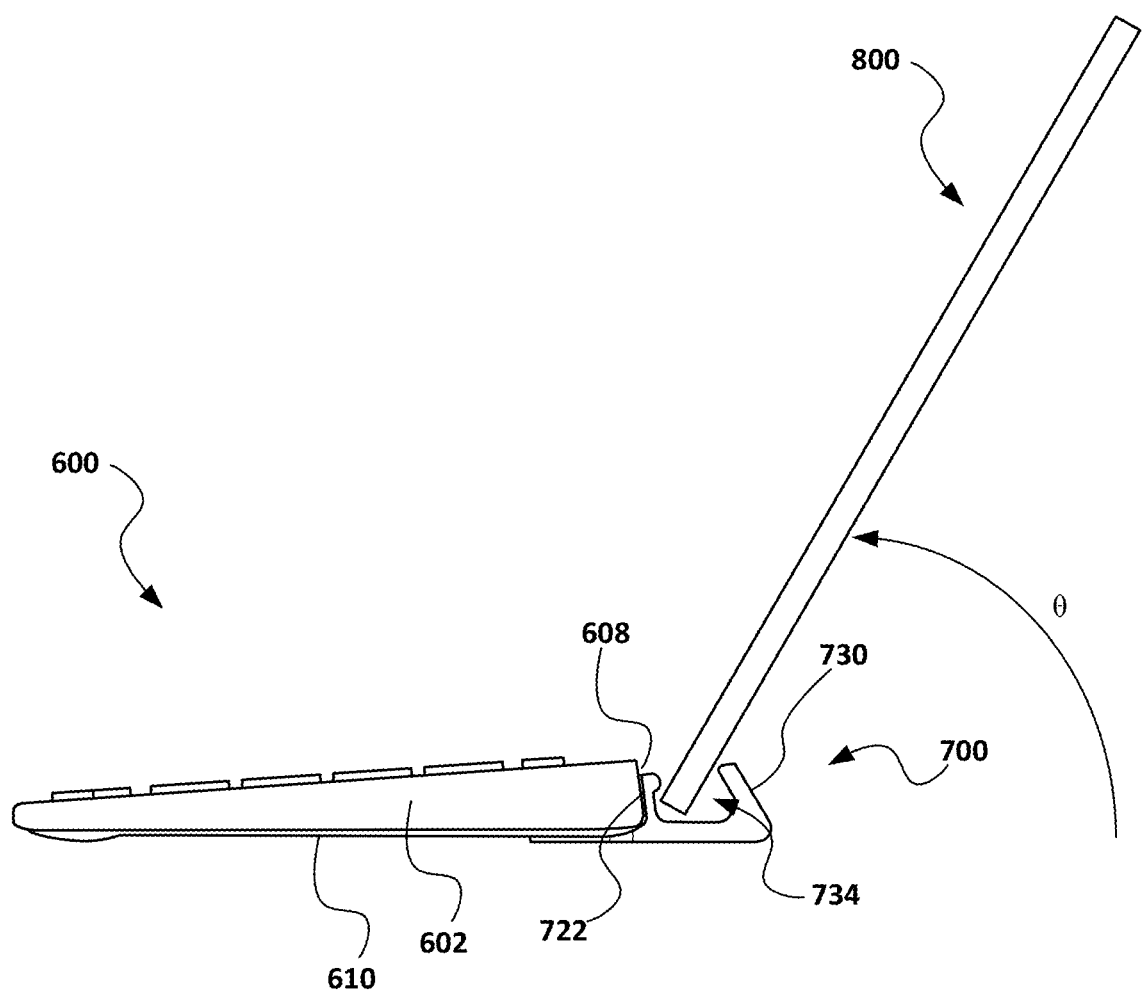
FIG. 6D shows a side elevation view of a mobile computing device supported by the device stand coupled with a keyboard of FIG. 6A.
Figure 6E:
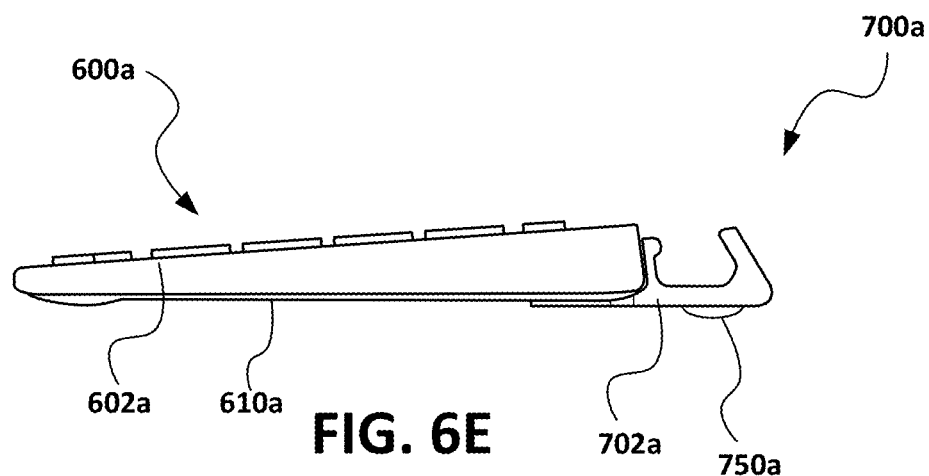
FIG. 6E shows a side elevation view of a mobile computing device supported by the device stand coupled with a keyboard of FIG. 6A.

FIG. 6D illustrates the keyboard 600 coupled with the device stand 700 (e.g., coupling mechanisms of the connector portion 714 are engaged with coupling mechanisms 614 of the battery access region 612) and supporting a mobile computing device 800 at a support angle θ. In some embodiments, when coupled the first support member 722 may be positioned against the rear surface 608 of the keyboard housing 602, which may enable the keyboard housing 602 to provide support that prevents the mobile computing device 800 or other object within the channel 734 from deforming the first support member 722 in a forward direction (e.g., toward the keyboard). A lower surface of the base 702 of the device stand 700 may not extend downward beyond a lowermost point of the keyboard housing 602 when the components are coupled. For example, the thickness of the connector portion 714 may match that of the battery cover being replaced such that a height or typing position of the keyboard 600 remains un-impacted when the device stand 700 is coupled with the keyboard housing 602. In other embodiments, a thickness of the connector portion 714 may be greater than a thickness of the battery cover, but may not extend lower than feet or other lowermost features of the keyboard housing 602. Such designs may ensure that the typing angle of the keyboard remains unchanged prevents the device stand 700 from negatively impacting the stability of the keyboard 600. In other embodiments, a device stand 700a may include one or more feet 750a that protrude from a base 702a and that elevate the bottom surface of the base 702a relative to the bottom surface 610a of the keyboard housing 602a as illustrated in FIG. 6E. In some embodiments, the feet 750a may elevate a portion of the keyboard 600a such that only a front region of the keyboard housing 602a and the feet 750a contact a support surface (such as a desk or table) and stabilize the keyboard 600a and any device secured within the channel 734a.

In some embodiments, a height of the support members of the device stand 700 may be selected to be lower than or approximately a same height as the keyboard housing 602. In other embodiments one or more of the support members may be higher than a highest portion of the keyboard housing 602. For example, in some embodiments, a height of the first support member 722 and/or second support member 730 may be selected to at least substantially follow an upward taper of the keyboard housing from front to back. In other embodiments, the heights of the first support member 722 and/or second support member 730 may be selected independently of the keyboard housing height, and may extend to any position that is higher, lower, or the same as the keyboard housing 602.

The device stand 700 may support the mobile computing device 800 (or other object) at the support angle θ when the mobile computing device 800 is positioned within the channel 734, with a lower front corner of the mobile computing device 800 contacting a rear surface 726 of the first support member 722, a lower rear corner of the mobile computing device 800 contacting a base of the channel 734, and a rear surface of the mobile computing device 800 contacting a distalmost surface 732 of the second support member 730. As previously discussed, the support angle θ may be determined by a width and/or depth (e.g., height of a lowermost support member) of the channel 734, an absolute height of the first support member 722 and/or second support member 730, and/or a relative height of the first support member 722 (and/or height of a nub positioned against the lower front corner of the mobile computing device 800) and second support member 730. In some embodiments, the support angle θ may be adjusted by positioning the lower rear corner of the mobile computing device 800 within a different groove within the channel 734, positioning the lower front corner of the mobile computing device 800 against a different nub on a rear surface of the first support member 722, adjusting an angle of the second support member 730, and/or otherwise changing a position of the mobile computing device 800 (or other object) within the channel 734.

The keyboard housing 602 and device stand 700 may be formed from and/or otherwise include the same or similar materials in some embodiments. For example, the keyboard housing 602 and device stand 700 may be made from polymeric materials, resins, and/or other materials. In some embodiments, the keyboard housing 602 and device stand 700 may be formed from entirely separate materials, while including coupling mechanisms that are engageable with one another.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A device stand, comprising:
a base comprising a support portion and a connector portion, wherein an upper surface of the connector portion comprises at least one hooked protrusion extending along only a portion of a width of the base, that is configured to engage with a corresponding recess of a keyboard housing to secure the base with the keyboard housing;
a first support member coupled with the support portion;
a second support member coupled with the support portion and laterally spaced apart from the first support member to form a channel between the first support member and the second support member, wherein the channel is sized to receive a computing device; and
wherein a rear surface of the first support member comprises a nub that protrudes laterally from the rear surface.

2. A device stand, comprising:
a base comprising a support portion and a connector portion, wherein an upper surface of the connector portion comprises at least one hooked protrusion extending along only a portion of a width of the base, that is configured to engage with a corresponding recess of a keyboard housing to secure the base with the keyboard housing;
a first support member coupled with the support portion;
a second support member coupled with the support portion and laterally spaced apart from the first support member to form a channel between the first support member and the second support member, wherein the channel is sized to receive a computing device; and
wherein a front portion of the first support member comprises an additional coupling mechanism that is configured to engage with a corresponding coupling feature of the keyboard housing.

3. The device stand of claim 1, wherein:
one or both of the first support member and the second support member comprises one or both of a high friction material and a compressible material.

4. The device stand of claim 1, wherein:
an interior angle of the second support member comprises a fillet.

5. A system for supporting a computing device, comprising:
a device stand comprising:
a base comprising a support portion and a connector portion, wherein:
an upper surface of the connector portion comprises a first coupling mechanism that is engageable with a second coupling mechanism of a keyboard housing to secure the base with the keyboard housing; and
the connector portion forms a cover for a component access region of the keyboard housing;
a first support member coupled with the support portion; and
a second support member coupled with the support portion and laterally spaced apart from the first support member to form a channel between the first support member and the second support member, wherein the channel is sized to receive a computing device; and
a keyboard comprising the keyboard housing having the second coupling mechanism to secure the base with the keyboard housing;
wherein the first coupling mechanism of the connector portion of the base is engageable with the second coupling mechanism of the keyboard housing to secure the base with the keyboard housing.

6. The device stand of claim 1, wherein:
a top surface of the support portion defines a number of grooves in a base of the channel.

7. The device stand of claim 1, further comprising:
a third support member coupled with the support portion and laterally spaced apart from the second support member to form an additional channel between the second support member and the third support member.

8. The device stand of claim 7, wherein:
one or both of a depth and a width of the additional channel and the channel are different.

9. The device stand of claim 1, wherein:
the second support member is coupled with the support portion via a hinge that adjusts an acute angle of the second support member relative to the support portion.

10. The device stand of claim 1, further comprising:
one or more extendible supports that are coupled with one or both of the base and the second support member.

11. The device stand of claim 10, wherein:
the one or more extendible supports are extendible using at least one feature selected from the group consisting of a foldable feature, a telescoping feature, and a removable connector.

12. The device stand of claim 1, further comprising:
a device charger disposed within the channel.

13. The system for supporting a computing device of claim 5, wherein:
when the first coupling mechanism and the second coupling mechanism are engaged with one another, a bottom surface of the base does not extend downward beyond a lowermost point of the keyboard housing.

14. The system for supporting a computing device of claim 5, wherein:
the component access region extends along a portion of both a bottom surface of the keyboard housing and a rear surface of the keyboard housing; and
the cover for the component access region is generally L-shaped and comprises at least a portion of a front surface of the first support member.

15. The system for supporting a computing device of claim 5, wherein:
the first support member is positioned against a rear surface of the keyboard housing when the first coupling mechanism and the second coupling mechanism are engaged with one another.

16. The system for supporting a computing device of claim 5, wherein:
the keyboard housing and the device stand comprise a same material.

17. The system for supporting a computing device of claim 5, wherein:
a height of each of the first support member and the second support member is less than a height of the keyboard housing.

18. The system for supporting a computing device of claim 5, wherein:
a bottom surface of the keyboard housing comprises a component access region having a first coupling mechanism; and
the connector portion forms a cover for the component access region.

* * * * *